(12) United States Patent
Miyamori

(10) Patent No.: US 10,157,335 B2
(45) Date of Patent: Dec. 18, 2018

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Shinya Miyamori, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 265 days.

(21) Appl. No.: 14/869,136

(22) Filed: Sep. 29, 2015

(65) Prior Publication Data

US 2016/0342868 A1  Nov. 24, 2016

(30) Foreign Application Priority Data

May 20, 2015 (JP) ................................. 2015-102611

(51) Int. Cl.
| | |
|---|---|
| *H04N 1/60* | (2006.01) |
| *H04N 1/00* | (2006.01) |
| *G06F 7/00* | (2006.01) |
| *G06K 15/00* | (2006.01) |
| *G06F 3/048* | (2013.01) |

(52) U.S. Cl.
CPC ............ *G06K 15/402* (2013.01); *G06F 3/048* (2013.01); *G06F 7/00* (2013.01); *G06K 15/407* (2013.01); *H04N 1/00002* (2013.01); *H04N 1/60* (2013.01)

(58) Field of Classification Search
CPC ......... H04N 1/00002; H04N 1/60; G06F 7/00
See application file for complete search history.

(56) References Cited

U.S. PATENT DOCUMENTS

| | | | |
|---|---|---|---|
| 6,941,522 B2 | 9/2005 | Brown | |
| 8,115,940 B2 | 2/2012 | Utsunomiya et al. | |
| 8,738,665 B2 | 5/2014 | Hunter et al. | |
| 2003/0214667 A1 | 11/2003 | Ishikura et al. | |
| 2005/0084277 A1 | 4/2005 | Kushida et al. | |
| 2006/0294182 A1 | 12/2006 | Enomoto et al. | |
| 2007/0188791 A1* | 8/2007 | Utsunomiya | H04N 1/00411 358/1.13 |
| 2007/0201068 A1 | 8/2007 | Matsuki | |

(Continued)

FOREIGN PATENT DOCUMENTS

| | | | |
|---|---|---|---|
| JP | 2003-124100 A | 4/2003 | |
| JP | 2004-178127 A | 6/2004 | |

(Continued)

OTHER PUBLICATIONS

Dec. 22, 2016 Office Action issued in Australian Patent Application No. 2015238871.

(Continued)

*Primary Examiner* — Matthew Salvucci
(74) *Attorney, Agent, or Firm* — Oliff PLC

(57) ABSTRACT

An information processing apparatus includes: a processing unit that sequentially performing processing on plural data; a display unit that displays information relevant to results of the processing performed on the data by the processing unit; and a control unit that, when processing performed on certain data of the plural data is completed by the processing unit, controls the display unit so as to display information relevant to a result of the processing performed on the data as information which indicates that data corresponding to a subsequent processing sequence is being processed.

8 Claims, 12 Drawing Sheets

(56) References Cited

U.S. PATENT DOCUMENTS

2010/0083146 A1     4/2010   Hasuike et al.
2013/0262527 A1*   10/2013   Hunter .................. G06F 3/0484
                                                                         707/805

FOREIGN PATENT DOCUMENTS

| JP | 2005-119138 A | 5/2005 |
| JP | 2007-006263 A | 1/2007 |
| JP | 2010-026542 A | 2/2010 |
| JP | 2010-237759 A | 10/2010 |
| JP | 2012-242821 A | 12/2012 |
| JP | 2015-069475 A | 4/2015 |

OTHER PUBLICATIONS

Dec. 4, 2015 Office Action issued in Japanese Patent Application No. 2015-102611.

* cited by examiner

*FIG. 11*

| C | M | Y | K |
|---|---|---|---|
| 1.27 | 0.80 | 0↓1↓2  2↓3↓4  7↓8↓9 | |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-102611 filed on May 20, 2015.

BACKGROUND

Technical Field

The present invention relates to an information processing apparatus and a non-transitory computer readable medium.

SUMMARY

An aspect of the present invention provides an information processing apparatus including: a processing unit that sequentially performing processing on plural data; a display unit that displays information relevant to results of the processing performed on the data by the processing unit; and a control unit that, when processing performed on certain data of the plural data is completed by the processing unit, controls the display unit so as to display information relevant to a result of the processing performed on the data as information which indicates that data corresponding to a subsequent processing sequence is being processed.

BRIEF DESCRIPTION OF THE DRAWINGS

Exemplary embodiment(s) of the present invention will be described in detail based on the following figures, wherein

FIG. 11 is a diagram illustrating an example of another method of displaying the image corresponding to the result of the banding processing according to the embodiment of the present invention.

DETAILED DESCRIPTION

Figure 1:
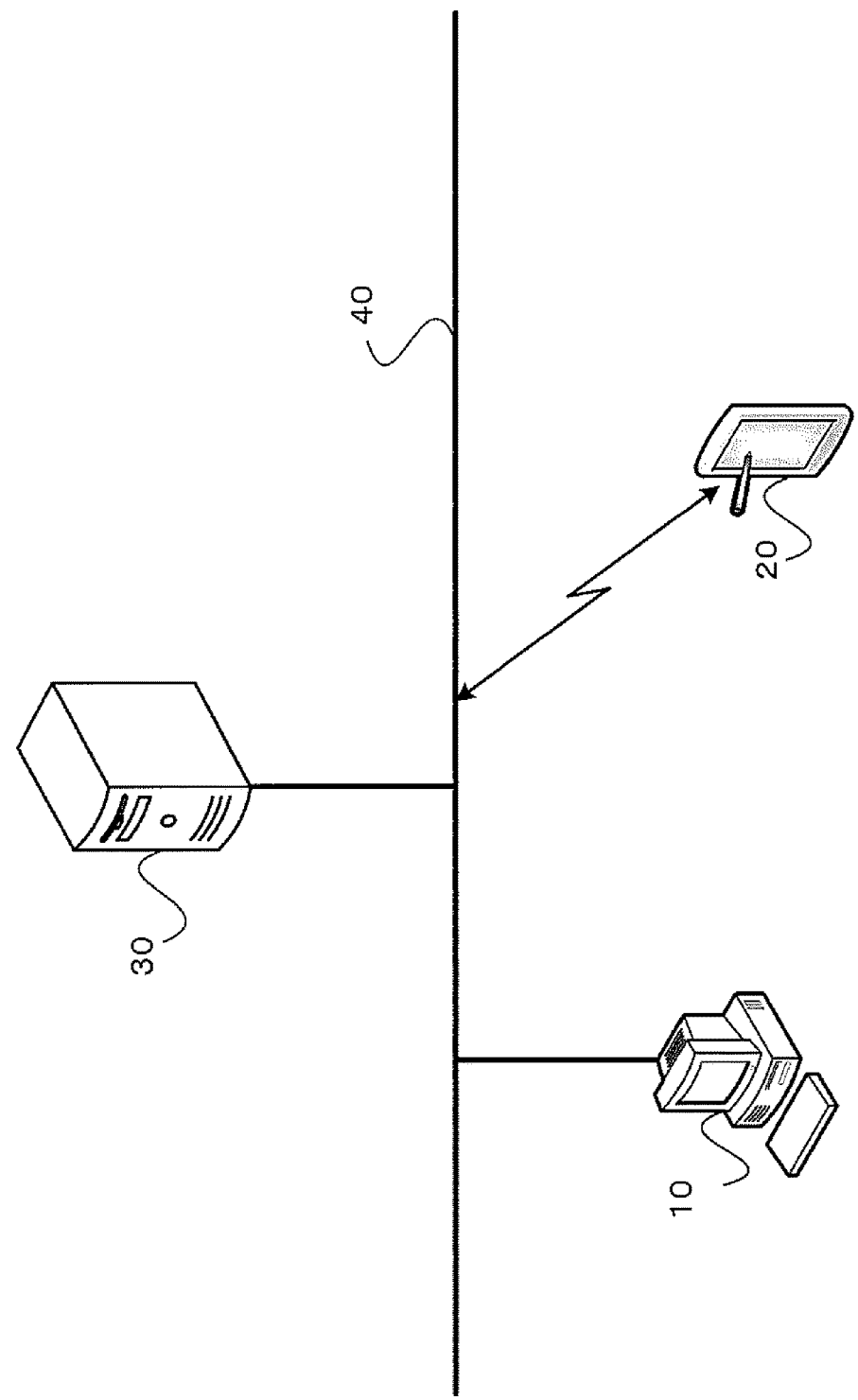
FIG. 1 is a diagram illustrating an information processing system according to an embodiment of the present invention.

Subsequently, an exemplary embodiment of the present invention will be described with reference to the accompanying drawings. FIG. 1 is a diagram illustrating the configuration of an information processing system according to the embodiment of the present invention.

As illustrated in FIG. 1, the information processing system according to the embodiment includes a terminal device 10, a mobile terminal device 20, and a server device 30. In addition, the terminal device 10, the mobile terminal device 20, and the server device 30 are respectively connected to each other through a network line 40. Meanwhile, in FIG. 1, the mobile terminal device 20 is connected to the terminal device 10 and the server device 30 through the network line 40 in a wireless manner. However, the mobile terminal device 20 is connected to the terminal device 10 and the server device 30 through the network line 40 in a wired manner.

Meanwhile, in the embodiment, the terminal device 10 and the server device 30 transmit data to be processed in the mobile terminal device 20. In addition, it is possible to use various small-sized mobile terminal devices, such as a mobile telephone, a tablet terminal device, a notebook-type personal computer and a mobile information terminal which is called a Personal Digital Assistant (PDA), as the mobile terminal device 20 if the mobile terminal devices have a function which is capable of displaying image information.

Figure 2:
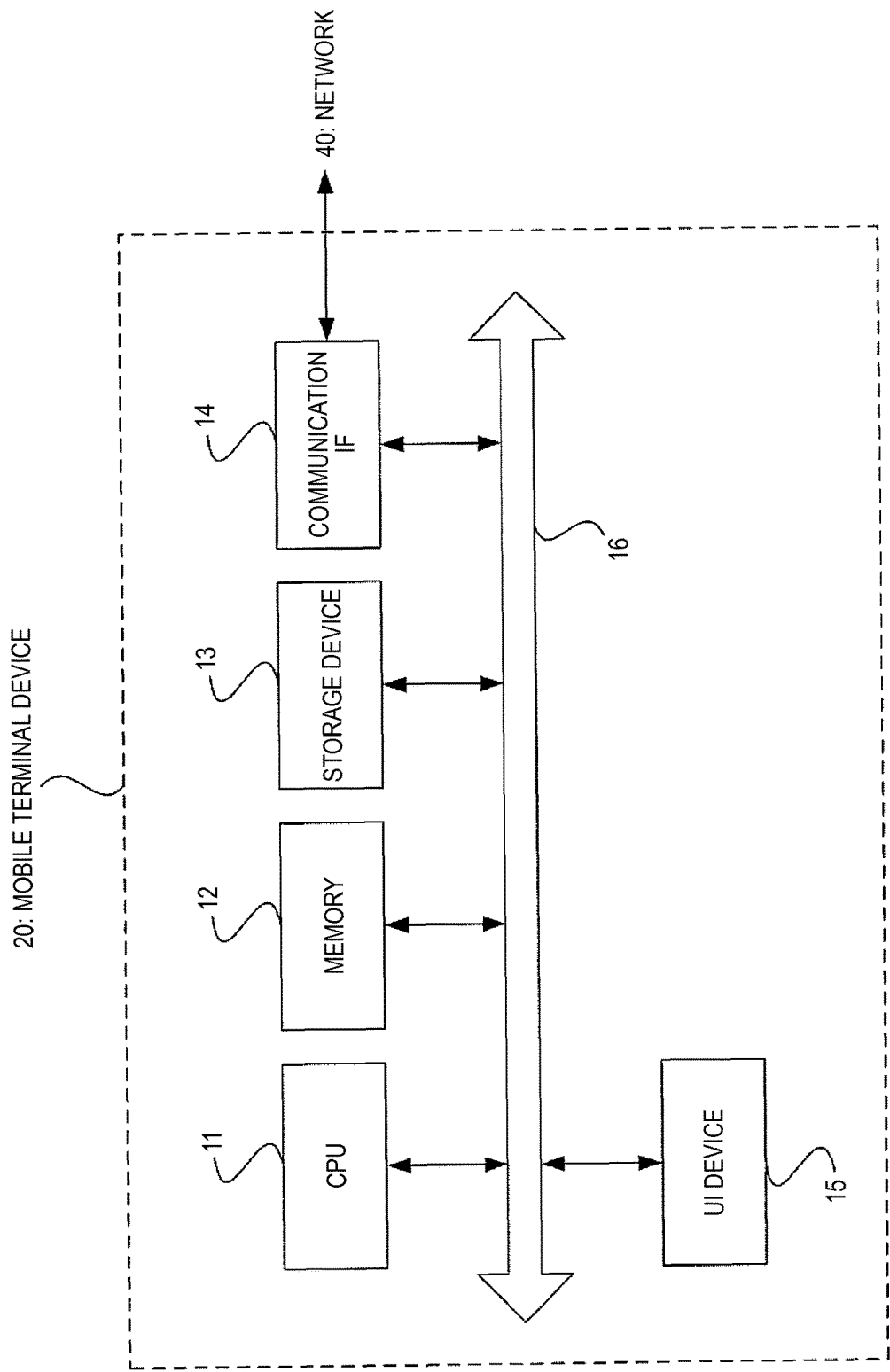
FIG. 2 is a block diagram illustrating the hardware configuration of a mobile terminal device 20 according to the embodiment of the present invention.

Subsequently, the hardware configuration of the mobile terminal device 20 in the information processing system according to the embodiment will be described with reference to FIG. 2. As illustrated in FIG. 2, the mobile terminal device 20 according to the embodiment includes a CPU 11, a memory 12, a storage device 13 such as a Hard Disk Drive (HDD), a communication interface (IF) unit 14 which transmits and receives data between the terminal device 10 and the server device 30 through the network line 40, and a User Interface (UI) device 15 which includes a touch panel or a liquid crystal display. Further, the components are connected to each other through a control bus 16.

The CPU 11 performs prescribed processing based on a printing control program which is stored in the memory 12 or the storage device 13, and controls the operation of the mobile terminal device 20.

Figure 3:
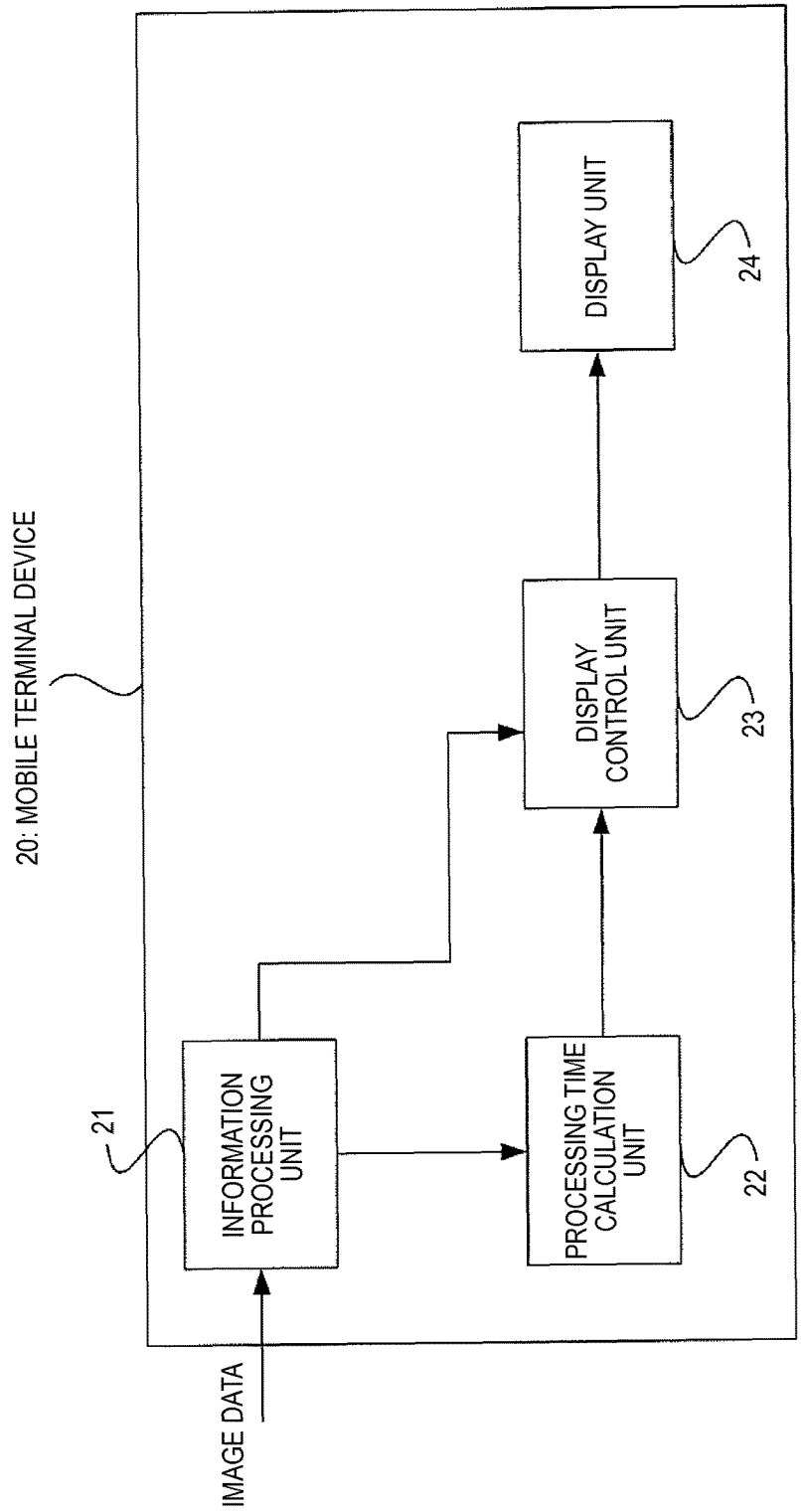
FIG. 3 is a block diagram illustrating the functional configuration of the mobile terminal device 20 according to the embodiment of the present invention.

FIG. 3 is a block diagram illustrating the functional configuration of the mobile terminal device 20 which is realized when the printing control program is executed.

As illustrated in FIG. 3, the mobile terminal device 20 includes an information processing unit 21, a processing time calculation unit 22, a display control unit 23, and a display unit 24.

The information processing unit 21 sequentially performs processing for plural data. In the embodiment, the information processing unit 21 uses the respective image data of cyan (C), magenta (M), yellow (Y) and black (K) colors which are transmitted from the terminal device 10 or the server device 30 as the plural data, and sequentially performs banding analysis processing for analyzing the unevenness of image qualities (banding) for the respective CMYK colors.

Meanwhile, in the embodiment, in order to analyze the unevenness (banding) of the image quality of an image which is output by an image forming device, such as a printer, an image (halftone image), which is painted at a specific concentration using only one color of each of the CMYK output on the paper by the image forming device, which is not shown in the drawing, is set to an original, and plural image data, which is acquired in such a way that the reading device reads the halftone images of the respective CMYK, is set to a banding analysis processing target. In addition, the image data, which is the banding analysis processing target, may be image data which is transmitted from the terminal device 10, the server device 30, or the image forming device which is not shown in the drawing, or may be image data which is previously preserved in the mobile terminal device 20.

The processing time calculation unit 22 calculates processing time which is necessary until the processing of the plural respective data is completed by the information processing unit 21. In the embodiment, the processing time calculation unit 22 calculates processing time which is necessary until the banding analysis processing is completed for the image data of the respective CMYK colors.

When processing performed on certain data is completed by the information processing unit 21, the display control unit 23 controls the display unit 24 to display information relevant to the result of the processing performed on the data as information which indicates that data corresponding to a subsequent processing sequence is being processed. In the embodiment, for example, when C color banding analysis processing is completed, the display control unit 23 controls the display unit 24 so as to display an image based on the result of the banding analysis processing performed on the C color is displayed as information which indicates that the banding analysis processing is being performed on a color corresponding to a subsequent processing sequence.

In addition, when the processing performed on the certain data is completed by the information processing unit 21, the display control unit 23 controls the display unit 24 so as to display the information relevant to the result of the processing performed on the data as information which indicates that the data corresponding to the subsequent processing sequence is being processed during the processing time that is calculated by the processing time calculation unit 22.

The display unit 24 displays the information relevant to the result of the processing performed on the data by the information processing unit 21. In the embodiment, the display unit 24 displays the information relevant to the result of the banding analysis processing performed on the respective CMYK colors.

Figure 4:
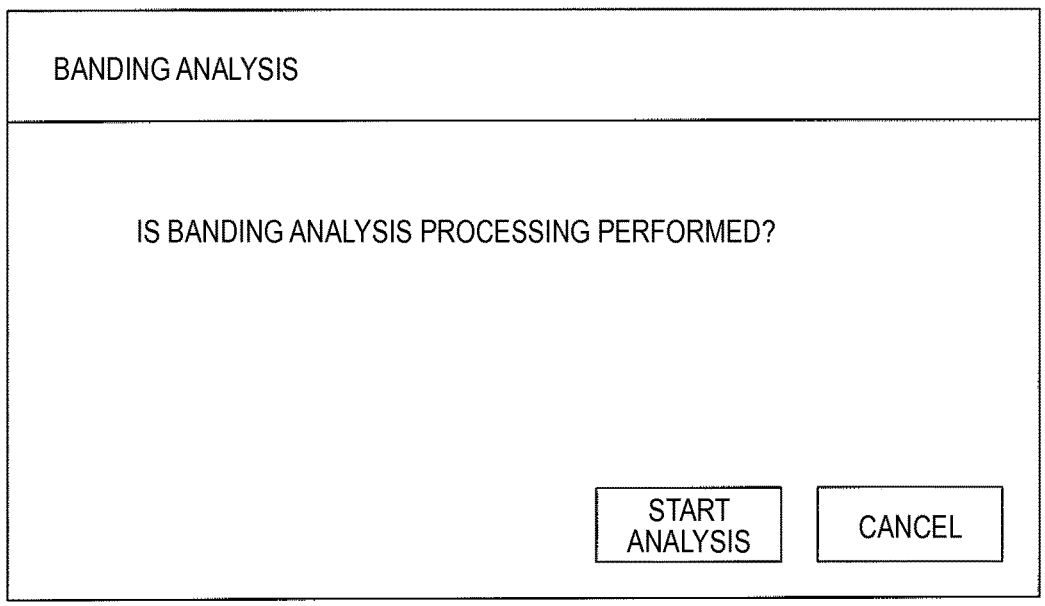
FIG. 4 is a diagram illustrating an example of a screen which is displayed by a display unit 24 according to the embodiment of the present invention.

Subsequently, an example of a screen which is displayed on the display unit 24 of the mobile terminal device 20 according to the embodiment will be described in detail with reference to FIGS. 4 and 5.

The mobile terminal device 20 according to the embodiment has a function of performing the banding analysis processing on the image data of the respective CMYK colors. When the banding analysis processing is performed, the display unit 24 displays a banding analysis execution screen as illustrated in FIG. 4.

Figure 5:
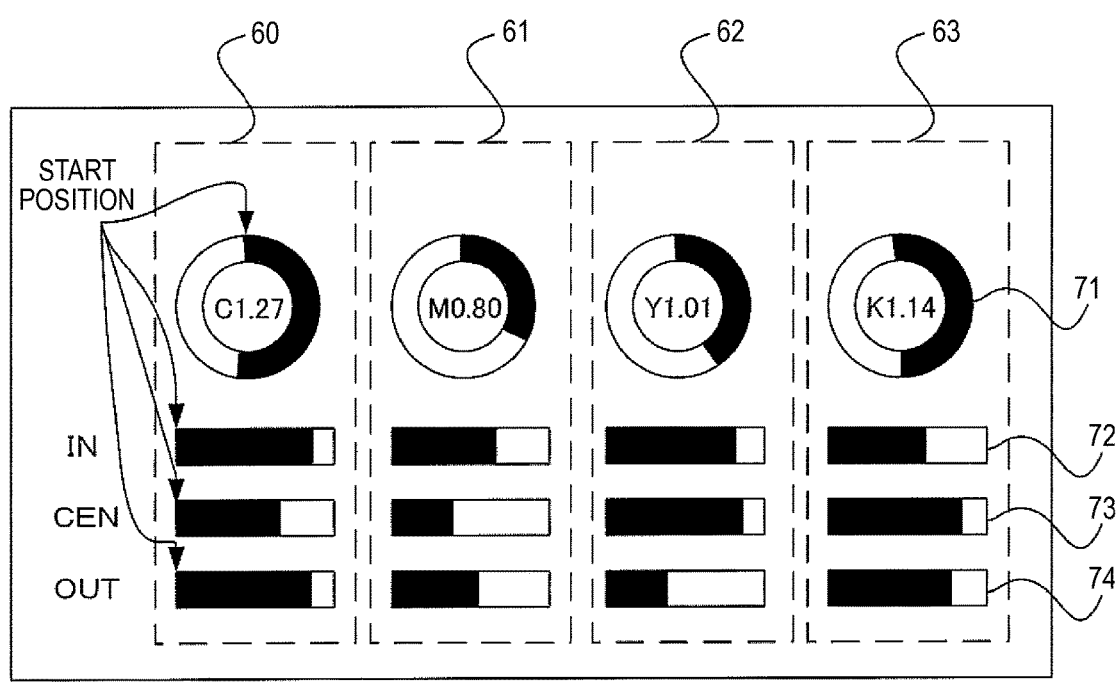
FIG. 5 is a diagram illustrating an example of an image corresponding to the result of banding processing according to the embodiment of the present invention.

Further, when a button "analysis start" on the banding analysis screen is pressed, the information processing unit 21 sequentially performs the banding analysis processing on the image data of the respective CMYK colors, and the display unit 24 finally displays a screen which shows the information relevant to the results of the banding analysis processing as illustrated in FIG. 5.

In an example of the screen illustrated in FIG. 5, an analysis processing result display area 60 corresponds to the C color, an analysis processing result display area 61 corresponds to the M color, an analysis processing result display area 62 corresponds to the Y color, and an analysis processing result display area 63 corresponds to the K color. In addition, images based on the respective results of the banding analysis processing are displayed as the respective color information relevant to the results of the banding analysis processing through animation (moving picture) in the analysis processing result display areas 60 to 63 corresponding to the respective CMYK colors. Specifically, as illustrated in FIG. 5, in the analysis processing result display areas 60 to 63 corresponding to the respective CMYK colors, a round bar 71 along the outer peripheral of a circle and straight line bars 72 to 74 along three straight lines are extended from start positions to respective arrival positions which are determined based on the results of the banding analysis process, thereby displaying the animation of the images corresponding to the results of the banding analysis processing performed on the respective CMYK colors. Meanwhile, the colors of the round bar 71 and the straight line bars 72 to 74 may be displayed using colors corresponding to the respective analysis processing result display areas 60 to 63.

In addition, in the embodiment, the arrival positions of the round bar 71 and the straight line bars 72 to 74 in the analysis processing result display areas 60 to 63 are determined based on the results of the banding analysis process, and the banding degrees of the respective CMYK colors are displayed through the lengths of the round bar 71 and the straight line bars 72 to 74 from the start positions to the arrival positions. In the embodiment, it is shown that the banding degrees are as large as the lengths of the respective round bar 71 and the straight line bars 72 to 74.

Specifically, as illustrated in FIG. 5, the lengths of the straight line bars 72 to 74 in each of the analysis processing result display areas 60 to 63 respectively indicate the banding degrees in the printer rear area (IN), the central area (CEN), and the printer front area (OUT) of the image data. In addition, the length of the round bar 71 in each of the analysis processing result display areas 60 to 63 indicates the banding degree of the entirety of the image data. In addition, as illustrated in FIG. 5, in the embodiment, the banding degree of the entirety of the image data is calculated for each of the CMYK colors based on the banding degrees in the left area (IN), the central area (CEN), and the right area (OUT) of the image data, thereby displaying the value of the banding degree of the entirety of the image data which is calculated inside the circles in the analysis processing result display areas 60 to 63. Meanwhile, in the embodiment, the lengths of the straight line bars 72 to 74 in each of the analysis processing result display areas 60 to 63 are set to the banding degrees in the printer rear area (IN), the central area (CEN) and the printer front area (OUT) of the image data. However, the present invention is not limited thereto, and, for example, the lengths of the straight line bars 72 to 74 may be set to respective banding degrees in the left area (IN), the central area (CEN), and the right area (OUT) of the image data.

Subsequently, a method of controlling the display unit 24 by the display control unit 23 according to the embodiment will be described in detail with reference to FIG. 6 and FIGS. 7A to 7C.

Figure 6:
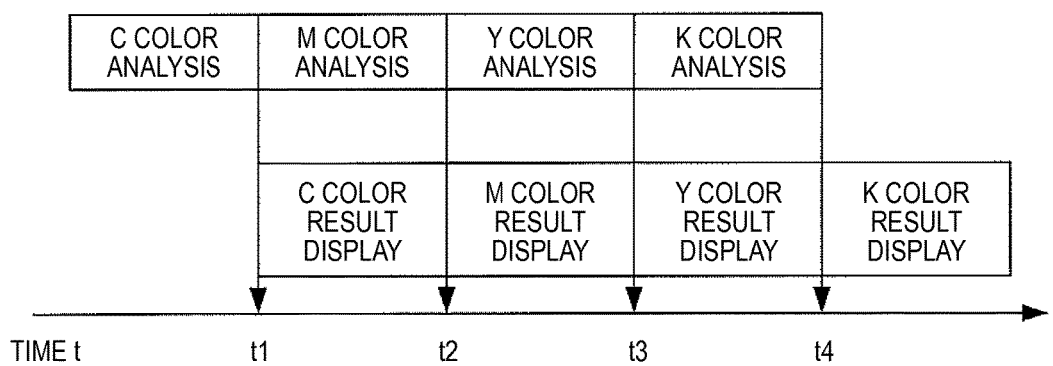
FIG. 6 is a timing chart illustrating the banding analysis processing and the display of the result of the analysis processing according to the embodiment of the present invention.
Figure 7A:
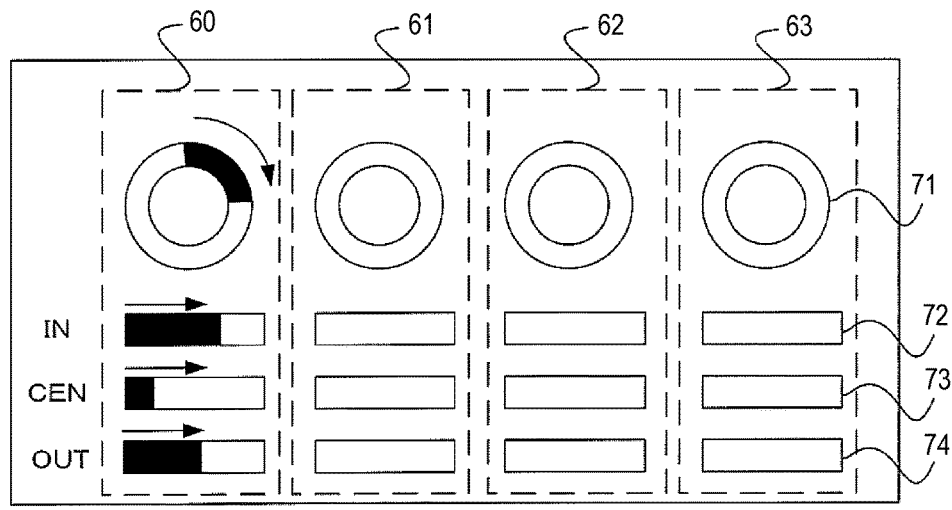
FIG. 7A is a diagram illustrating an example of the animation display of the image corresponding to the result of the banding analysis processing according to the embodiment of the present invention.
Figure 7B:
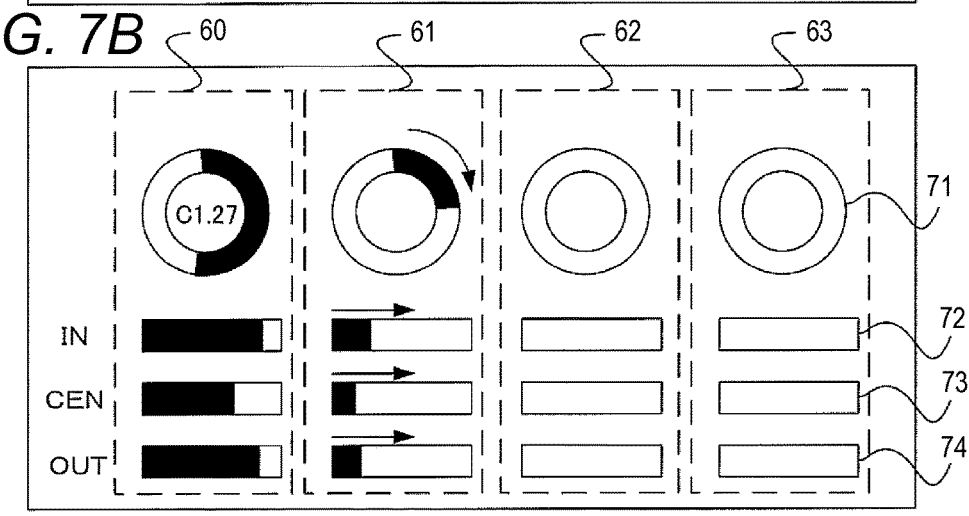
FIG. 7B is a diagram illustrating an example of the animation display of the image corresponding to the result of the banding processing according to the embodiment of the present invention.
Figure 7C:
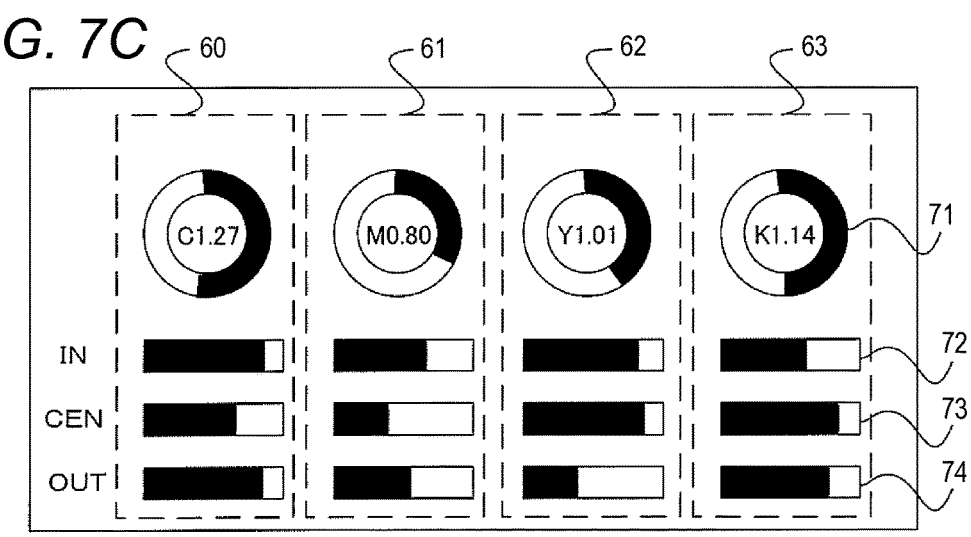
FIG. 7C is a diagram illustrating an example of the animation display of the image corresponding to the result of the banding processing according to the embodiment of the present invention.

FIG. 6 is a timing chart illustrating the banding analysis processing and the display of the results of the analysis processing according to the embodiment. In addition, FIGS. 7A to 7C are diagrams illustrating examples of the animation display of the image corresponding to the results of the banding process.

As illustrated in FIG. 6, the information processing unit 21 sequentially performs the banding analysis processing on the image data of the respective CMYK colors corresponding to the analysis processing target. In the embodiment, description is performed as if the information processing unit 21 has been previously set to perform the banding analysis processing in order of C, M, Y, and K. However, it is possible to appropriately set the sequence of the colors on which the banding analysis processing is performed.

As illustrated in FIG. 6, when the banding analysis processing is performed, the information processing unit 21 first starts the banding analysis processing on the C color. Further, when the banding analysis processing performed on the C color is completed, the display control unit 23 controls the display unit 24 such that the animation display of an image corresponding to the result of the banding analysis processing performed on the C color starts, and the information processing unit 21 starts the banding analysis processing on the M color (t1). Specifically, as illustrated in FIG. 7A, in the analysis processing result display area 60 corresponding to the C color, animation display starts in which the round bar 71 is extended from the start position in the arrow direction and the straight line bars 72 to 74 are extended from the start positions in the arrow direction.

In the embodiment, when the animation display of the image corresponding to the result of the banding analysis processing performed on the C color is performed, the display control unit 23 determines the arrival positions of the round bar 71 and the straight line bars 72 to 74 in the analysis processing result display area 60 corresponding to the C color based on the result of the banding analysis processing performed on the C color. Further, animation display, in which the extension speeds of the round bar 71 and the straight line bars 72 to 74 are adjusted, is performed so as to reach the arrival positions when time corresponding to M color processing time, which is calculated by the processing time calculation unit 22, elapses from when the animation display of the image corresponding to the result of the banding analysis processing performed on the C color starts. Meanwhile, animation display of an image corresponding to the result of the banding analysis processing performed on a color other than the C color is performed in the same manner.

Meanwhile, the result of the processing to be displayed does not exist yet during the banding analysis processing performed on the C color. Therefore, when the banding analysis processing is being performed on the C color, the display control unit 23 may control the display unit 24 so as to display, for example, progress bars or the like as information which indicates that the banding analysis processing is performed. In addition, when the progress bars or the like are displayed when the banding analysis processing is being performed on the C color, the display control unit 23 controls the display unit 24 so as to stop the display of the progress bars or the like and to start the display of the image corresponding to the result of the banding analysis processing performed on the C color when the C color banding analysis processing is completed.

Subsequently, as illustrated in FIG. 6, when the banding analysis processing performed on the M color is completed, the display control unit 23 starts the animation display of the image corresponding to the result of the banding analysis processing performed on the M color in the analysis processing result display area 61 corresponding to the M color (t2). Further, the information processing unit 21 starts the banding analysis processing performed on the Y color. In addition, as illustrated in FIG. 7B, the display control unit 23 stops the animation display in which the round bar 71 and the straight line bars 72 to 74 are extended in the analysis processing result display area 60 corresponding to the C color. In this case, as illustrated in FIG. 7B, in the analysis processing result display area 60, the round bar 71 and the straight line bars 72 to 74 reach the arrival positions which are determined based on the result of the banding analysis processing performed on the C color, and an image, which indicates the banding degree of the C color, is displayed based on the lengths of the round bar 71 and the straight line bars 72 to 74 from the start positions to the arrival positions. In addition, as illustrated in FIG. 7B, when the animation display of the image corresponding to the result of the banding analysis processing performed on the C color stops, the display control unit 23 controls the display unit 24 such that the value of the banding degree of the entirety of the image data is displayed inside of the circle in the analysis processing result display area 60. Meanwhile, in the embodiment, description is performed such that the value of the banding degree of the entirety of the image data, which is acquired from when the animation display of the image corresponding to the result of the banding analysis processing performed on the C color stops, is displayed inside of the circle in the analysis processing result display area 60. However, when the animation display of the image corresponding to the result of the banding analysis processing performed on the C color is performed, first, the value of the banding degree of the entirety of the image data of the C color may be displayed inside of the circle in the analysis processing result display area 60, and the animation display of the image corresponding to the result of the banding analysis processing performed on the C color may start.

Further, in (t3) and (t4), the same processing is performed on the Y color and the K color as in the C color and the M color. Therefore, when the banding analysis processing performed on the entirety of the CMYK colors is completed, the respective images corresponding to the results of the banding analysis processing performed on the colors are displayed as illustrated in FIG. 7C. Meanwhile, when the banding analysis processing is completely performed on the K color, animation display, in which the round bar 71 and the straight line bars 72 to 74 are extended from the start positions to the arrival positions, may not be performed in the analysis processing result display area 63 corresponding to the K color, and an image corresponding to the result of the banding analysis processing may be displayed in a state in which the round bar 71 and the straight line bars 72 to 74 reach the arrival positions which are determined based on the result of the banding analysis processing performed on the K color.

Figure 8:
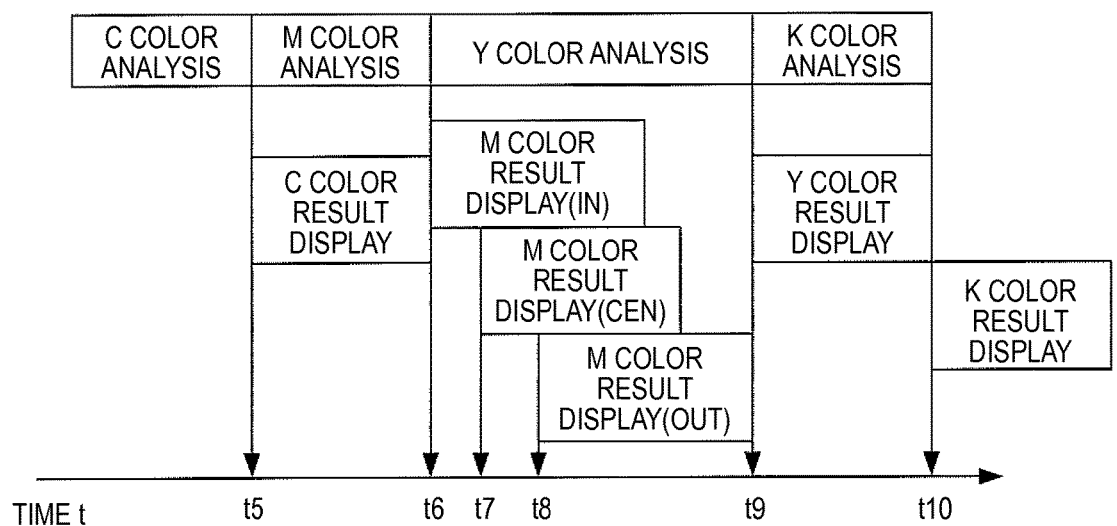
FIG. 8 is a timing chart illustrating a banding analysis processing and the display of the result of the analysis processing according to the embodiment of the present invention.
Figure 9A:
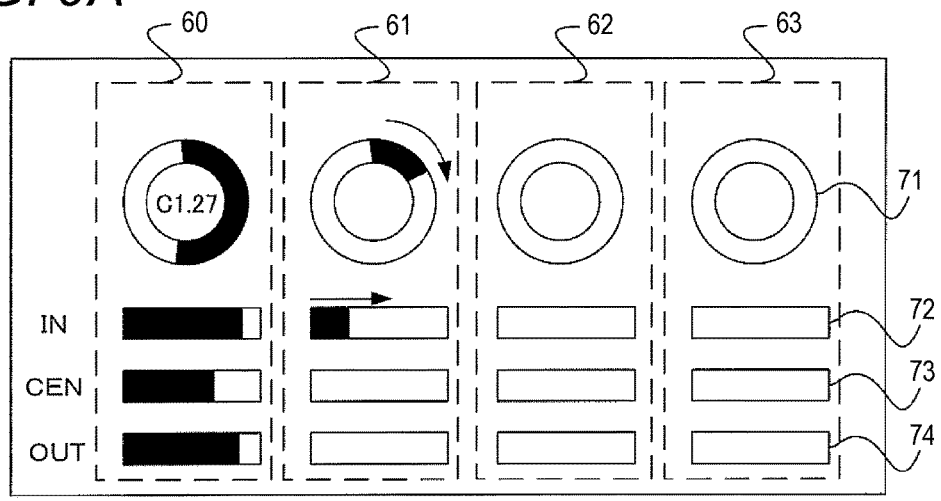
FIG. 9A is a diagram illustrating an example of the animation display of the image corresponding to the result of the banding processing according to the embodiment of the present invention.

In addition, for example, when Y color processing time is longer than another color processing time, the animation display, which is completed immediately before, of the image corresponding to the result of the banding analysis processing performed on the M color may be divided and performed. Specifically, as illustrated in FIG. 8, the display control unit 23 performs animation display which indicates the extension of the round bar 71 in the analysis processing result display area 61 corresponding to the M color, and first starts animation display which indicates the extension of the straight line bar 72 (IN) (t6). In this case, as illustrated in FIG. 9A, animation display for the straight line bars 73 and 74 in the analysis processing result display area 61 corresponding to the M color does not start.

Figure 9B:
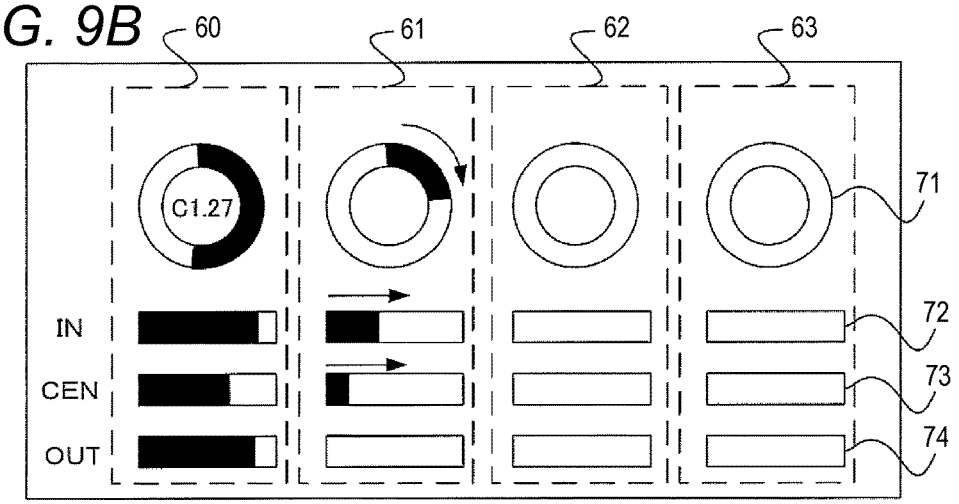
FIG. 9B is a diagram illustrating an example of the animation display of the image corresponding to the result of the banding processing according to the embodiment of the present invention.

Further, as illustrated in FIG. 8, after prescribed time elapses, animation display which indicates the extension of the straight line bar 73 (CEN) starts (t7). In this case, as illustrated in FIG. 9B, in the analysis processing result display area 61 corresponding to the M color, the animation display which indicates the extension of the round bar 71 and the straight line bar 72 (IN) are continued, animation display of the straight line bar 73 (CEN) starts, and animation display of the straight line bar 74 does not start.

Figure 9C:
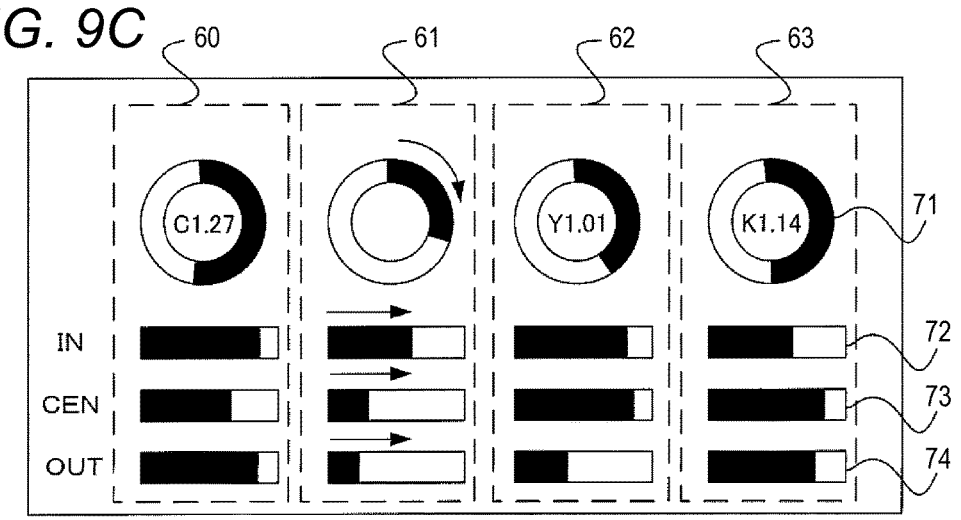
FIG. 9C is a diagram illustrating an example of the animation display of the image corresponding to the result of the banding processing according to the embodiment of the present invention.

Further, as illustrated in FIG. 8, after prescribed time elapses, animation display which indicates the extension of the straight line bar 74 (OUT) starts (t8). In this case, in the analysis processing result display area 61 corresponding to the M color, animation display which indicates the extension of the round bar 71, the straight line bar 72 (IN) and the straight line bar 73 (CEN) is continued and the animation display of the straight line bar 74 (OUT) starts, as illustrated in FIG. 9C.

Figure 10:
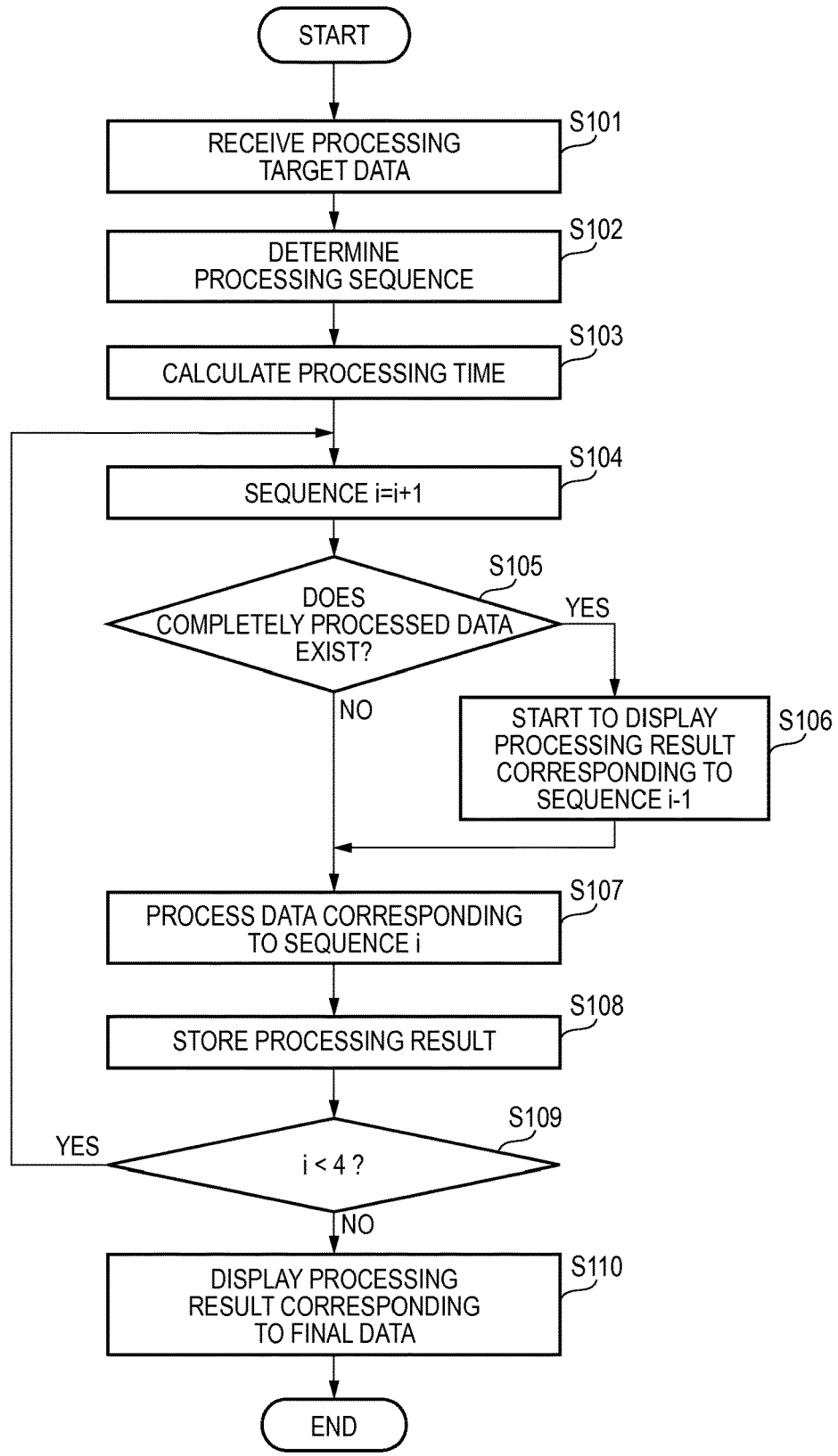
FIG. 10 is a flowchart illustrating the flow of processing performed by the mobile terminal device 20 according to the embodiment of the present invention.

Subsequently, a flow of processing performed by the mobile terminal device 20 according to the embodiment will be described with reference to a flowchart illustrated in FIG. 10.

First, the mobile terminal device 20 receives plural image data of the respective CMYK colors, which is an analysis processing target, from the terminal device 10 or the server device 30 (step S101).

Subsequently, the information processing unit 21 determines a sequence for performing the banding analysis processing of the received plural image data (step S102).

Further, the processing time calculation unit 22 calculates the processing time which is necessary until the banding analysis processing is completed for each of the image data of the respective CMYK colors (step S103).

In addition, the information processing unit 21 selects a color, on which the banding analysis processing is performed, based on the sequence determined in step S102. In the embodiment, 1 is added to a sequence i (initial value 0), and a color corresponding to the sequence i is selected as a target on which the banding analysis processing is performed (step 104). For example, the information processing unit 21 selects the C color as the target on which the banding analysis processing is performed when sequence i=1, selects the M color as the target on which the banding analysis processing is performed when sequence i=2, selects the Y color as the target on which the banding analysis processing is performed when sequence i=3, and selects the K color as the target on which the banding analysis processing is performed when sequence i=4.

Subsequently, the display control unit 23 determines whether or not there is a color in which the banding analysis processing is completed (step S105). When there is not any color in which the banding analysis processing is completed (non in step S105), the process proceeds to step S107.

In addition, when there is a color in which the banding analysis processing is completed (yes in step S105), the display control unit 23 controls the display unit 24 so as to start the animation display of an image corresponding to the result of the banding analysis processing performed on a color corresponding to a sequence i-1, that is, a color on which the banding analysis processing has been completed immediately before (step S106). At this time, the display control unit 23 controls the display unit 24 so as to perform the animation display of the image corresponding to the result of the banding analysis processing performed on the color corresponding to the sequence i-1 during the processing time of the sequence i calculated in the processing time calculation unit 22.

Further, the information processing unit 21 performs the banding analysis processing on a color corresponding to the sequence selected in step S104 (step S107).

Subsequently, when the banding analysis processing is completed, the information processing unit 21 stores the result of the banding analysis processing in the storage device which is not shown in the drawing (step S108).

Further, the information processing unit 21 determines whether or not the banding analysis processing performed on a color corresponding to the final sequence is completed. In the embodiment, in order to sequentially perform the banding analysis processing on the four CMYK colors, the information processing unit 21 determines whether or not the sequence i is smaller than 4 (step S109). When the sequence i is smaller than 4 (yes in step S109), the process returns to step S104, and the above processing is repeated.

When the sequence i is equal to or larger than 4 (no in step S109), that is, the banding analysis processing performed on the color corresponding to the final sequence is completed, the display control unit 23 controls the display unit 24 so as to display an image corresponding to the result of the finally completed banding analysis processing performed on the color (step S110).

Figure 11:
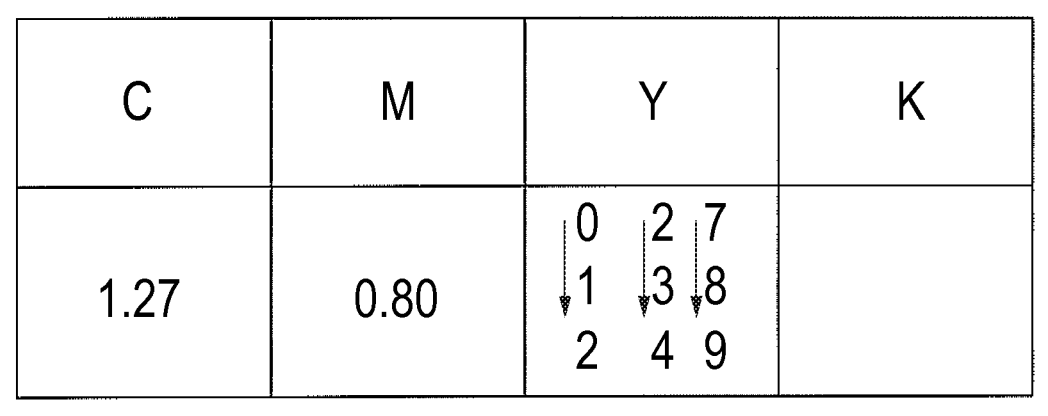

Meanwhile, in the embodiment, description is performed such that the information relevant to the result of the banding analysis processing is displayed as information which indicates that the banding analysis processing is being performed on a color corresponding to a subsequent sequence by performing the animation display through the extension of the round bar 71 and the straight line bars 72 to 74. However, the display of the information which indicates that the banding analysis processing is being performed on the color corresponding to the subsequent sequence is not limited to the animation display through the extension of the round bar 71 and the straight line bars 72 to 74. For example, as illustrated in FIG. 11, the banding degree of each of the colors is set to a numerical value based on the result of the banding analysis process, and so-called slot display, in which numerical values from 0 to 9 sequentially flow in the arrow direction for each digit, is performed. When the slot display stops, control is performed such that the value of the banding degree which is set to the numerical value for each color is displayed. Therefore, the slot display may be used as information which indicates that the banding analysis processing is being performed on a color corresponding to a subsequent sequence. In the example illustrated in FIG. 11, the slot display is performed for the numerical value of the banding degree of the Y color, thereby showing that the banding analysis processing is being performed on the K color.

Figure 12:
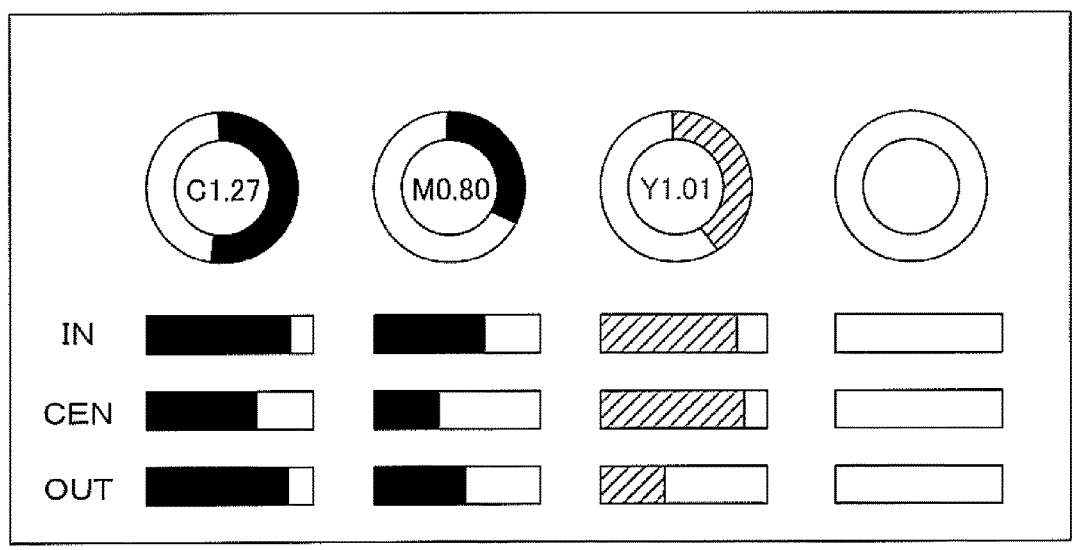
FIG. 12 is a diagram illustrating an example of another method of displaying the image corresponding to the result of the banding processing according to the embodiment of the present invention.

In addition, as illustrated in FIG. 12, display is performed such that the concentration of the image corresponding to the result of the banding analysis processing gradually increases, and thus the image may be displayed as the information which indicates that the banding analysis processing is being performed on the color corresponding to the subsequent processing sequence. In the example illustrated in FIG. 12, display is performed such that the concentration of the image corresponding to the result of the banding analysis processing corresponding to the Y color, which is displayed in the analysis processing result display area 62, gradually grows, thereby showing that the banding analysis processing is being performed on the K color.

In addition, in the embodiment, description is performed such that an image based on the result of the banding analysis processing is displayed as animation. However, the image based on the result of the banding analysis processing may be gradually displayed. Specifically, the display control unit 23 updates the lengths of the round bar 71 and the straight line bars 72 to 74 whenever a prescribed amount of time elapses, and performs display such that the round bar 71 and the straight line bars 72 to 74 gradually reach the arrival positions from the start positions. Therefore, the display unit 24 may be controlled such that the image based on the result of the banding analysis processing is gradually displayed.

In addition, in the embodiment, description is performed such that the information processing unit 21 performs the banding analysis processing for the image data of each of the CMYK colors. However, if the processing performed on the plural data is sequentially performed, the present invention is not limited to the banding analysis processing.

In addition, in the embodiment, the mobile terminal device 20 is described as an example of the information processing apparatus. However, the present invention is not limited to the form of a device if display unit for displaying information relevant to the result of the processing performed on the plural data is included.

Further, in the embodiment, description is performed such that the processing time, which is necessary until the banding analysis processing performed on each of the CMYK colors is completed, is calculated in the information processing unit 21. However, the processing time may not be calculated. In this case, the display control unit 23 may perform the animation display of the image corresponding to the result of the banding processing for a predetermined time. In addition, when the animation display of an image corresponding to the result of banding processing performed on a certain color and the banding analysis processing performed on a color corresponding to a subsequent processing sequence are completed, the display control unit 23 may control the display unit 24 so as to perform animation display of the image corresponding to the result of the color banding analysis processing performed on a color corresponding to a subsequent sequence as information which indicates that the banding analysis processing is being performed on a color corresponding to a further subsequent processing sequence.

In addition, in the embodiment, description is performed such that, when the banding analysis processing is completed, the animation display of the image corresponding to the result of the banding processing starts. However, when the processing is completed to a degree in which it is possible to display the image corresponding to the result of the banding analysis processing performed on the certain color, the result of the banding analysis processing performed on the color may be displayed as the information which indicates that the banding analysis processing is being performed on the color corresponding to the subsequent processing sequence. For example, when the banding analysis processing is performed on the C color and the analysis processing performed on the C color is performed at a predetermined progress degree, the animation display of the image corresponding to the result of the banding analysis processing performed on the C color may start.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 a processing unit that sequentially performs banding analysis processing for respective colors of image data having plural color image data;
 a display unit that displays information relevant to results of the banding analysis processing performed for the respective colors of the color image data through lengths of bars from start positions to arrival positions; and
 a control unit that, when banding analysis processing performed on certain color image data that is not a last color image data of the plural color image data is completed by the processing unit, controls the display unit so as to start performing animation display of the bar corresponding to the completed certain color image data, wherein the bar extends from the start position to the arrival position, and an extending speed of the bar is adjusted such that the bar reaches the arrival position when the processing unit completes banding analysis processing for a subsequent color image data, and that controls the display unit so as to display the bar corresponding to the last color image data.

2. The information processing apparatus according to claim 1,
 wherein, when the banding analysis processing performed on the certain color image data that is not the last color image data of the plural color image data is completed by the processing unit, the control unit controls the display unit so as to perform animation display of the bar corresponding to the completed certain color image data based on the result of the banding analysis processing performed on the color image data through a moving picture.

3. The information processing apparatus according to claim 1,
 wherein, when the banding analysis processing performed on the certain color image data that is not the last color image data of the plural color image data is completed by the processing unit, the control unit controls the display unit so as to gradually display the bar corresponding to the completed certain color image data based on the result of the banding analysis processing performed on the completed color image data.

4. The information processing apparatus according to claim 1,
wherein, when the banding analysis processing performed on the certain color image data that is not the last color image data of the plural color image data is completed by the processing unit, the control unit controls the display unit so as to display an image, of which a concentration is gradually thick, based on the result of the banding analysis processing performed on the completed color image data.

5. The information processing apparatus according to claim 1, further comprising:
a calculation unit that calculates processing time which is necessary until the banding analysis processing performed on each of the plural color image data is completed by the processing unit,
wherein the control unit controls the display unit so as to display information which indicates that a subsequent color image data corresponding to the subsequent banding analysis processing sequence is being processed during the processing time which is calculated by the calculation unit.

6. The information processing apparatus according to claim 1, wherein, when the bar reaches the arrival position and the banding analysis processing performed on a subsequent color image data corresponding to the subsequent banding analysis processing sequence is completed, the control unit controls the display unit so as to display information relevant to the result of the banding analysis processing performed on the subsequent color image data as information which indicates that color image data corresponding to a further subsequent banding analysis processing sequence is being processed.

7. A non-transitory computer readable medium causing a computer to execute information processing, the processing comprising:

sequentially performing banding analysis processing for respective colors of image data having plural color image data;
controlling, when bandin analysis processing performed on certain color image data that is not a last color image data of the plural color image data is completed, so as to start performing animation display of a bar corresponding to the completed certain color image data, wherein the bar extends from a start position to an arrival position, and an extending speed of the bar is adjusted such that the bar reaches the arrival position when the processing unit completes banding analysis processing for a subsequent color image data; and
controlling so as to display the bar corresponding to the last color image data.

8. An information processing apparatus comprising:
a processing unit that sequentially performs banding analysis processing for respective colors of image data having plural color image data;
a display unit that displays information relevant to results of the banding analysis processing performed for the respective colors of the color image data through lengths of bars from start positions to arrival positions; and
a control unit that, when the banding analysis processing is completed by the processing unit in a degree in which it is possible to display a result of processing performed on certain color image data of the plural color image data, controls the display unit so as to start performing animation display of the bar corresponding to the completed certain color image data, wherein the bar extends from the start position to the arrival position, and an extending speed of the bar is adjusted such that the bar reaches the arrival position when the processing unit completes banding analysis processing for a subsequent color image data, and that controls the display unit so as to display the bar corresponding to a last color image data.

* * * * *